United States Patent
Yajima et al.

(10) Patent No.: US 9,039,073 B2
(45) Date of Patent: May 26, 2015

(54) METHOD OF MANUFACTURING VEHICLE BODY SIDE STRUCTURE AND VEHICLE BODY SIDE STRUCTURE

(71) Applicants: Masaki Yajima, Ota (JP); Takashi Kanai, Ota (JP)

(72) Inventors: Masaki Yajima, Ota (JP); Takashi Kanai, Ota (JP)

(73) Assignee: TOA Industries Co., Ltd., Ota-shi (JP)

( * ) Notice: Subject to any disclaimer, the term of this patent is extended or adjusted under 35 U.S.C. 154(b) by 0 days.

(21) Appl. No.: 14/186,731

(22) Filed: Feb. 21, 2014

(65) Prior Publication Data

US 2014/0239672 A1    Aug. 28, 2014

(30) Foreign Application Priority Data

Feb. 26, 2013    (JP) ................................. 2013-035652

(51) Int. Cl.
| | |
|---|---|
| *B60J 7/00* | (2006.01) |
| *B62D 25/04* | (2006.01) |
| *B21D 22/20* | (2006.01) |
| *B21D 35/00* | (2006.01) |
| *B62D 29/00* | (2006.01) |

(52) U.S. Cl.
CPC .............. *B62D 25/04* (2013.01); *B62D 29/007* (2013.01); *B21D 22/208* (2013.01); *B21D 35/007* (2013.01)

(58) Field of Classification Search
USPC ............. 296/203.03, 193.06, 193.05, 203.01, 296/205, 29
See application file for complete search history.

(56) References Cited

U.S. PATENT DOCUMENTS

| | | | |
|---|---|---|---|
| 8,424,961 B2 * | 4/2013 | Carsley et al. ................ 296/210 |
| 2006/0097549 A1 * | 5/2006 | Fischer et al. ........... 296/203.03 |
| 2014/0147693 A1 | 5/2014 | Yasuyama et al. | |

FOREIGN PATENT DOCUMENTS

| | | |
|---|---|---|
| EP | 2 006 190 | 12/2008 |
| JP | 9-188274 | 7/1997 |
| JP | 2007-314817 | 12/2007 |
| JP | 2009-1121 | 1/2009 |
| JP | 2010-173403 | 8/2010 |
| WO | WO-2012/036262 | 3/2012 |

* cited by examiner

*Primary Examiner* — Joseph D Pape
(74) *Attorney, Agent, or Firm* — Morrison & Foerster LLP

(57) ABSTRACT

First to third steel members are cut to form predetermined planar shapes using press machines and form an upper member, a reinforcement member and a lower member. The carbon content of the third steel member is set lower than the carbon content of the first and second steel members. The upper member, the reinforcement member and the lower member are then assembled. The reinforcement member is superposed on the upper member. The upper member and the lower member are partially superposed. The superposed portions of the upper member and the reinforcement member and the superposed portions of the upper member and the lower member are then respectively joined by spot welding to form a blank member. The spot welded blank member is then heated to a temperature of a transformation point or higher, and the blank member is hot press formed by one press machine.

4 Claims, 4 Drawing Sheets

← Vehicle outside

← Vehicle outside

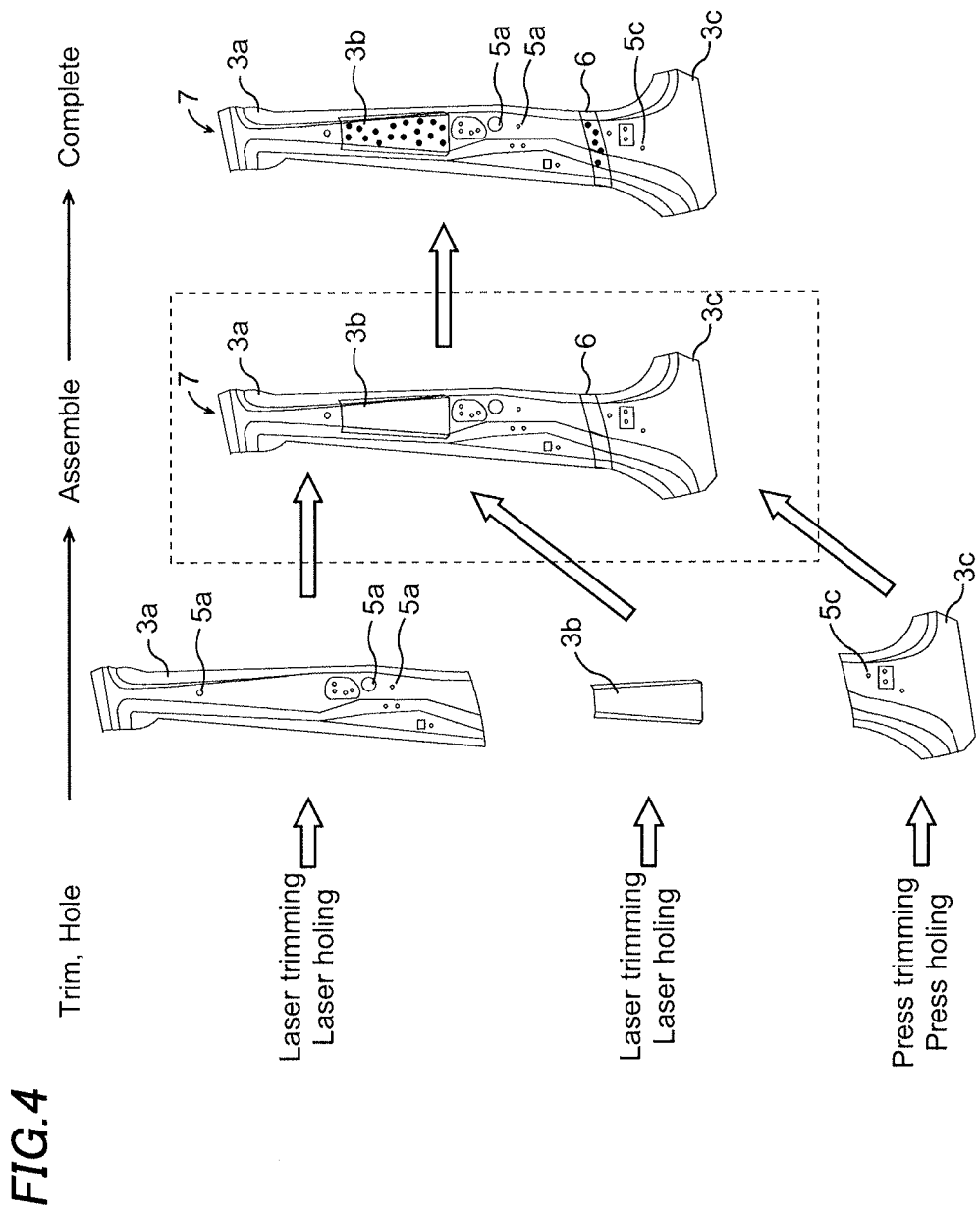

METHOD OF MANUFACTURING VEHICLE BODY SIDE STRUCTURE AND VEHICLE BODY SIDE STRUCTURE

CROSS-REFERENCE OF THE INVENTION

This application claims priority from Japanese Patent Application No. 2013-035652, filed Feb. 26, 2013, the content of which is incorporated herein by reference in its entirety.

BACKGROUND OF THE INVENTION

1. Field of the Invention

The invention relates to a method of manufacturing a vehicle body side structure and a vehicle body side structure.

2. Description of the Related Art

A center pillar is disposed in the vertical direction of a vehicle body side portion, as a vehicle body side structure. The center pillar is configured so as to have a pillar reinforcement between a pillar outer panel and a pillar inner panel.

In this vehicle body side structure, a strength change point is provided below the center portion of the center pillar in the vertical direction so that the strength of the member is higher in the upper portion from this strength change point and is lower in the lower portion.

This vehicle body side structure has an advantage. Since the lower portion of the center pillar deforms more easily than the upper portion, when a vehicle crashes at its side, the deformation shape of the center pillar is controlled and the center pillar is prevented from hurting an occupant, thereby protecting the occupant.

In more detail, the pillar reinforcement of the center pillar is formed by superposing the upper member and the lower member partially and joining these superposed portions each other by spot welding etc. The upper member is made of a high tensile steel sheet formed by hot press forming (hot stamping). The hot press forming is to press a heated steel sheet by a mold. Since the quenching effect by the mold enhances the annealing of the steel sheet, the strength of the steel sheet is increased significantly.

On the other hand, the lower member is made of an ordinary rolled steel sheet etc, and the strength is set lower than that of the hot press member. In other words, when the upper member and the lower member are compared, the upper member has higher strength than the lower member.

Next, referring to FIGS. 3 and 4, a conventional method of manufacturing a pillar reinforcement 7 will be described. The pillar reinforcement 7 includes an upper member 3a, a lower member 3c, and a reinforcement member 3b for reinforcing the upper member 3a. The reinforcement member 3b is provided at a height corresponding to the breast of an occupant.

As shown in FIG. 3, rolled steel members 1a, 1b and 1c are cut to have predetermined planar shapes using press machines 2a, 2b and 2c, respectively, to form the upper member 3a, the reinforcement member 3b and the lower member 3c. The steel members 1a and 1b are steel sheets for hot press, and the steel member 1c is a steel sheet for cold press.

The upper member 3a and the reinforcement member 3b are then heated to a predetermined temperature and hot press formed using press machines 4a and 4b. By this, the upper member 3a and the reinforcement member 3b are annealed by the quenching effect by the mold, and thus the strength is increased significantly.

On the other hand, since the lower member 3c is cold press formed by a press machine 4c without a heating process, the strength is lower than that of the upper member 3a and the reinforcement member 3b. In this case, the upper member 3a is bent at the peripheral end portion to form a ship bottom shape, and the reinforcement member 3b and the lower member 3c have such a shape that the peripheral end portion is bent corresponding to the shape of the upper member 3a.

Then, as shown in FIG. 4, using a laser beam, laser trimming is performed so as to remove unnecessary portions of the upper member 3a, the reinforcement member 3b and the lower member 3c, and holes 5a and 5c for attaching necessary components are also formed.

Then the upper member 3a, the reinforcement member 3b and the lower member 3c are assembled. At this time, the reinforcement member 3b is superposed on the upper member 3a. Furthermore, the upper member 3a and the lower member 3c are partially superposed. Then the superposed portions of the upper member 3a and the reinforcement member 3b and the superposed portions 6 of the upper member 3a and the lower member 3c are spot welded to join the individual members, completing the pillar reinforcement 7. A relevant technique is disclosed in Japanese Patent Application Publication No. 2010-173403.

However, in the conventional method of manufacturing the pillar reinforcement 7, since the individual members are assembled and the spot welding is performed after the upper member 3a, the reinforcement member 3b and the lower member 3c are press formed as described above, there is a problem that the spot welding portion is limited. This is because a spot welding portion is limited to a flat region of each of the members and the flat region is narrowed unavoidably since the peripheral ends of the individual members are bent in the case of spot welding after press forming.

Furthermore, in the case of spot welding after press forming, since the spot welded portion and the peripheral portion thereof are naturally cooled after the welding, there is a problem that the strength is decreased.

Furthermore, since the upper member 3a, the reinforcement member 3b and the lower member 3c are hot press formed or cold press formed as described above, there is a problem that the process is complex.

SUMMARY OF THE INVENTION

The invention provides a method of manufacturing a vehicle body side structure. The method includes forming an upper member by cutting a first steel sheet, forming a lower member by cutting a second steel sheet having a carbon content lower than a carbon content of the first steel sheet, forming a blank member by superposing the upper member and the lower member partially and spot welding superposed portions to join the upper member and the lower member, and hot press forming the blank member so that a strength of the lower member is lower than a strength of the upper member.

The invention also provides a vehicle body side structure that includes an upper member including a first steel member, and a lower member including a second steel member having a carbon content lower than a carbon content of the first steel member. The upper member and the lower member are superposed partially. The structure also includes a spot welded portion formed in superposed portions of the upper member and the lower member. The strength of the lower member is lower than the strength of the upper member.

BRIEF DESCRIPTION OF THE DRAWINGS

FIG. 4 is a view of conventional processes of manufacturing a vehicle body side structure.

DETAILED DESCRIPTION OF THE INVENTION

Figure 1:
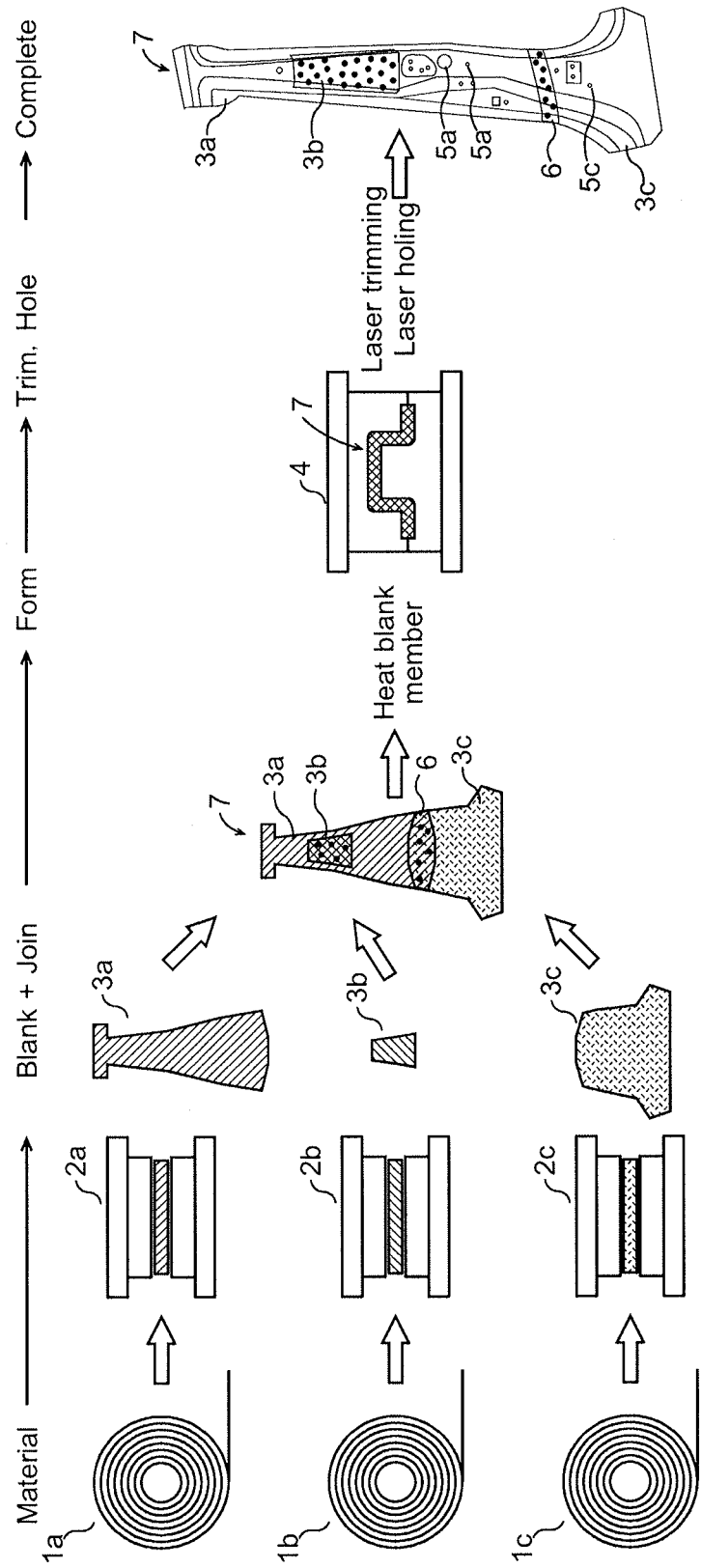
FIG. 1 is a view of processes of manufacturing a vehicle body side structure in an embodiment of the invention.

Hereafter, a method of manufacturing a vehicle body side structure in an embodiment of the invention will be described referring to FIGS. 1, 2A and 2B.

In the embodiment, an upper member 3a and a lower member 3c are joined each other through superposed portions 6 by spot welding to form a blank member, and this blank member is then hot press formed. It is generally known that the annealing effect when hot press forming is performed depends on the carbon content of a steel member.

In detail, in hot press forming, annealing reinforcement is made by heating a steel member to a transformation point or higher and transforming the metal structure of the steel member from austenite to martensite by quenching by a mold. At this time, as the carbon content of the steel member is higher, the transformation to martensite is more enhanced to increase the strength. On the other hand, when the carbon content of the steel member is low, the transformation to martensite is limited to decrease the strength. In general, it is known that when the carbon content is 0.5% or lower, the strength of the steel member is observed to decrease, and when the carbon content is 0.3% or lower, the annealing effect hardly occurs.

Therefore, in the manufacturing method of the embodiment, the carbon content of the lower member 3c is set lower than the carbon content of the upper member 3a so as to limit the annealing of the lower member 3c and make the strength of the lower member 3c lower than the strength of the upper member 3a.

Hereafter, the method of manufacturing the vehicle body side structure will be described in detail. First, rolled steel members 1a, 1b and 1c are cut to have predetermined planar shapes using press machines 2a, 2b and 2c, respectively, to form an upper member 3a, a reinforcement member 3b and a lower member 3c. Although all the steel members 1a, 1b and 1c are steel sheets for hot press, the carbon content of the steel member 1c is set lower than the carbon content of the steel members 1a and 1b.

Then, the upper member 3a, the reinforcement member 3b and the lower member 3c are assembled. The reinforcement member 3b is superposed on the upper member 3a. Furthermore, the upper member 3a and the lower member 3c are partially superposed. Then the superposed portions of the upper member 3a and the reinforcement member 3b and the superposed portions 6 of the upper member 3a and the lower member 3c are respectively spot welded to join the members, thereby forming a blank member. At this time, since the upper member 3a, the reinforcement member 3b and the lower member 3c are not press formed yet, all the surface of each of the members is flat and the degree of freedom of the spot welding portion is enhanced.

The spot welded blank member is then heated to a temperature of the transformation point of the upper member 3a and the reinforcement member 3b or higher by a furnace, and the heated blank member is hot press formed by a press machine 4. By this, the upper member 3a and the reinforcement member 3b are annealed by the quenching effect by the mold since the carbon content is high, for example, 0.5% or higher, and thus the strength becomes high significantly. On the other hand, since the carbon content of the lower member 3c is low, for example, 0.3% or lower, the annealing is limited and the strength becomes lower than that of the upper member 3a and the reinforcement member 3b. The blank member after the hot press is bent at its peripheral end portion to have a ship bottom shape, i.e., a three-dimensional structure, the cross-section of which is shown in the press machine 4 in FIG. 1.

Then a shaping process (e.g. laser trimming) for removing an unnecessary portion of the blank member is performed using a laser beam, and holes 5a and 5c for attaching components are formed according to needs, thereby completing the pillar reinforcement 7.

As described above, in the embodiment, since the upper member 3a and the lower member 3c are joined by spot welding through the superposed portions 6 to form a blank member and then this blank member is hot press formed, there is an advantage that the degree of freedom of the spot welding portion is enhanced. Furthermore, the hot press forming is performed after the spot welding, the strength of the spot welded portion and the peripheral portion thereof is increased by annealing. Furthermore, since the blank member is hot press formed, the press forming is performed in one process. Still furthermore, since a shaping process such as laser trimming is performed and the holes 5a and 5c are formed after the hot press forming, there is an advantage that the process is economized compared with conventional processes performed for each of the members.

Figure 2A:
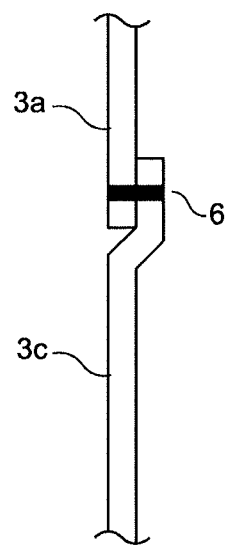
FIGS. 2A and 2B are cross-sectional views of a pillar reinforcement.
Figure 2B:
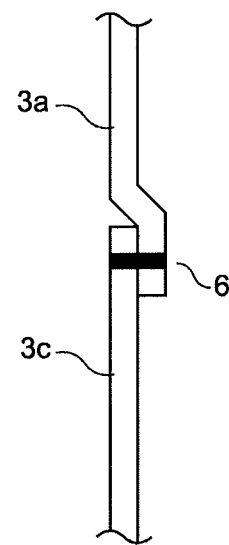
Figure 3:
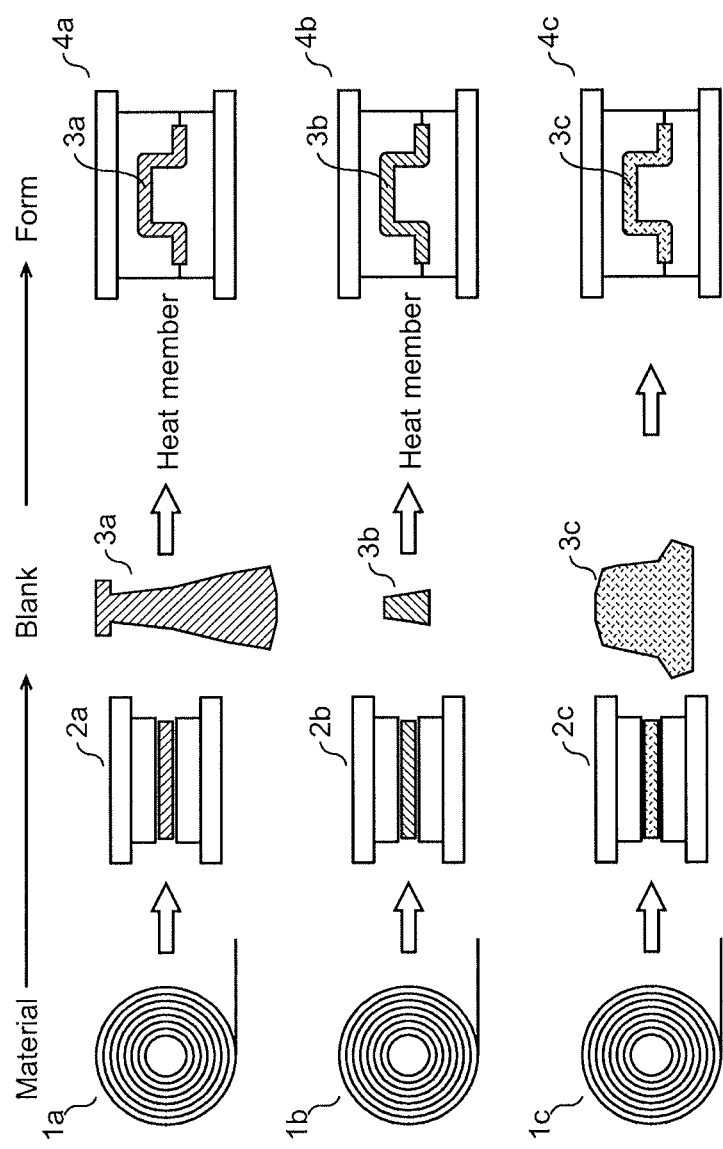
FIG. 3 is a view of conventional processes of manufacturing a vehicle body side structure.

FIGS. 2A and 2B are cross-sectional views of the superposed portions 6 of the upper member 3a and the lower member 3c. As shown in FIG. 2A, when the superposed portions 6 are formed by superposing the lower member 3c on the upper member 3a from inside in the vehicle width direction, it is likely that the spot welded portion of the superposed portions 6 is broken by impact when the vehicle crashes at its side to separate both the members. Therefore, in order to keep the join of both the members, as shown in FIG. 2B, it is preferable that the superposed portions 6 are formed by superposing the lower member 3c on the upper member 3a from outside in the vehicle width direction.

Next, a concrete example of the invention will be described. A high carbon concentration member is used as the rolled steel members 1a and 1b, and a low carbon concentration member is used as the rolled steel member 1c. Furthermore, in the heating process for hot press, a blank member after spot welded is heated to 950° C. By this, the strength of the upper member 3a and the reinforcement member 3b of the pillar reinforcement 7 after the hot press is 1500 MPa (megapascal), and the strength of the lower member 3c is 590 MPa.

In the invention, after an upper member and a lower member are joined through superposed portions by spot welding to form a blank member, this blank member is hot press formed. Therefore, there is an advantage of increasing the degree of freedom of the spot welding portion.

Furthermore, since the hot press forming is performed after the spot welding, the strength of the spot welded portion and the peripheral portion thereof is enhanced by annealing.

Furthermore, since the blank member is hot press formed, the press forming can be performed in one process.

What is claimed is:

1. A vehicle body side structure comprising:
   an upper member comprising a first steel member;
   a lower member comprising a second steel member having a carbon content lower than a carbon content of the first steel member, the upper member and the lower member being superposed partially; and
   a spot welded portion formed in superposed portions of the upper member and the lower member, wherein a strength of the lower member is lower than a strength of the upper member.

2. The vehicle body side structure of claim 1, further comprising a reinforcement member comprising a third steel member and spot welded on the upper member, wherein the strength of the lower member is lower than a strength of the reinforcement member.

3. The vehicle body side structure of claim 1, wherein the upper member is located on an interior side of a vehicle at superposed portions of the upper member and the lower member.

4. The vehicle body side structure of claim 1, wherein the carbon content of the first steel sheet is 0.5% or higher, and the carbon content of the second steel sheet is 0.3% or lower.

* * * * *